3,154,431
METHOD OF TREATING A SURFACE WITH A STABLE AQUEOUS SILANOL DISPERSION
Thomas R. Santelli, Toledo, Ohio, assignor, by mesne assignments, to Johns-Manville Fiber Glass Inc., Cleveland, Ohio, a corporation of Delaware
No Drawing. Continuation of application Ser. No. 279,960, Apr. 1, 1952. This application Oct. 16, 1957, Ser. No. 690,427
4 Claims. (Cl. 117—161)

This invention relates to the production of stable aqueous silanol dispersions. More particularly the invention relates to the production of stable aqueous silanol dispersions by hydrolyzing selected silanes in buffered aqueous solutions.

This application is a continuation of my copending application Serial No. 279,960, filed April 1, 1952, now abandoned.

One of the greatest impediments to the commercialization of silanols as water and heat resistant coatings is that they have not been available in the form of stable aqueous solutions or dispersions. Attempts to produce aqueous silanols heretofore, such as by neutralization of aqueous alkaline siliconates, have resulted in the formation of polymeric silanols which precipitated from the aqueous phase substantially as rapidly as they were formed. Therefore, it has been customary to apply the alkaline siliconates per se to render materials water repellent.

Use of these materials, however, is undesirable because of the substantial proportion of associated alkali which is highly corrosive. Where the corrosiveness can not be tolerated the alkali must be removed by washing or other equally expensive and time consuming process step.

There is therefore an important need for silanols in stable aqueous solution or dispersion for large volume, low-cost operations. This need is especially important where small quantities of silanol per square foot are to be applied to the material to be treated.

Aqueous solutions of silanols are also desirable because materials which require treatment to be rendered water repellent are generally readily wet by water and it is this ease of wetting that is the occasion for treatment to impart water repellency to the material.

It is accordingly an important object of this invention to provide a method for the production of stable aqueous dispersions of silanols.

It is a further object to provide a method for the production of stable aqueous dispersions of silanols wherein selected silanes are hydrolyzed in buffered aqueous solutions.

A still further object is to provide a method for the production of stable aqueous dispersions of organo silanols by hydrolyzing selected organo silanes in buffered aqueous solutions.

The present invention is based upon the discovery that by proceeding in an unorthodox manner it is possible to obtain a substantially neutral solution which is a stable aqueous dispersion of a silanol.

In accordance with the present invention stable aqueous dispersion of a silanol is prepared by adding a selected hydrolyzable silane to an aqueous solution of a selected buffer. The amount of buffer employed will be sufficient to retain the pH of the resulting dispersion between 3 and 8.

The procedure for the production of a stable aqueous silanol dispersion in accordance with the present invention comprises adding the hydrolyzable silane to a previosuly prepared aqueous solution of a buffer. The rate of addition of the silane may be as rapid as is consistent with temperature control.

It is desirable to use a large excess of water over that which is required to hydrolyze the silane, to avoid gellation. Such a large amount of water need not be present during the hydrolysis however. Instead it may be added after hydrolysis to dilute the silane dispersion to a desired concentration. However, the amount of water used for hydrolysis should be great enough so that the aqueous phase of the resulting dispersion prior to further dilution is at least from about 80 to about 90% of the dispersion. The water used for hydrolysis may be retained at ordinary temperatures, i.e., about 10 to 40° C., but it is preferred that it be maintained at about 5 to 10° C.

In the hydrolysis of a silane by the present method, the buffer is employed to prevent the pH of the aqueous phase from dropping below 3, which normally occurs during hydrolysis of halogenated silanes because of the formation of hydrogen halide as the halide atoms attached to silicon are replaced by hydroxy groups.

At a pH below 3, as has been the experience of the prior art, the silanol formed would condense and precipitate from the aqueous phase. Accordingly buffers are employed which are effective to sustain the 3 to 8 pH range.

Two indicators should be used during the hydrolysis so that the rates of addition can be controlled to prevent the pH during the hydrolysis from going below 3 or above 8. The pH is usually maintained at about 6.8 to 7.5 during the hydrolysis.

It is preferred that the proportion of buffer in the aqueous hydrolysis medium be sufficient to take up the halogen atoms as they are released from the halosilane during hydrolysis. Thus for example, when sodium acetate is employed as the buffer, sodium chloride will be formed in the aqueous phase. Concomitantly acetic acid will be formed. However, since acetic is a weak acid the pH of the system will be retained in the range between 3 and 8. This pH range is considered to be substantially neutral since it permits the silanol formed to remain in the highly dispersed phase without precipitation.

It is preferable to adjust the pH of a dilute silanol dispersion produced by the method of the invention between about 4 and about 7, and more desirable between about 5 and about 6. Such a composition is stable in such pH range as evidenced by a lack of gel particles in the dilute dispersion when it is permitted to stand before being used.

The stability of a silanol dispersion produced by the method of the invention may be from one hour to several days to two weeks depending on the particular silanol, concentration of silanol, pH, temperature, etc.

The product of invention is a silanol having an average unit structure corresponding to the formula

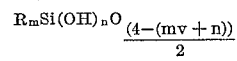

wherein $m$ is a number from .05 to 3; $n$ is a number from 1 to 3.95; the sum of $mv+n$ is from 2 to 4; $v$ is the average valence of the group R; and the groups R are organic groups having from one to twelve carbon atoms, as hereinbefore defined.

The term "monomeric silanol" is used herein to mean a substance whose molecule contains one silicon atom to which from one to three hydroxy groups are attached, or two to three such silicon atoms which are connected by divalent organic groups, the remaining free valences of the silicon atom(s) being attached by

linkages to monovalent organic groups. Thus, $v$ in the above general formula is a number from 1 to 2.

Silanols produced by the present method may be partially condensed, i.e., may contain some polymeric molecules which can be considered to be derived by condensation between hydroxy groups attached to silicon atoms in two or more molecules of monomeric silanols, with the formation of

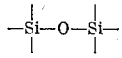

linkages. Thus, the letter "$n$" in the formula for the average unit structure of a silanol produced in the method of the invention indicates the average degree of condensation in the silanol molecules. It is believed, however, that in at least part of the molecules of such a silanol $n$ equals $4-mv$, i.e., that at least part of the silanol molecules remain in monomeric form. The fact that a silanol produced in the practice of the invention is capable of being dispersed in aqueous medium, indicates that the silanol molecules are of very low average molecular weight.

Silanes applicable for use as starting materials in the present method include those corresponding to the general formulae

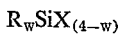

or

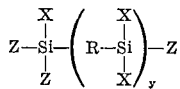

or

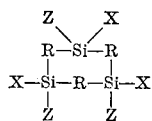

or

wherein R is an organic group containing from 1 to 12 carbon atoms inclusive; $w$ is an integer from 1 to 3 inclusive; X is chlorine, bromine or fluorine; Z is R or X; and $y$ is an integer from 1 to 2.

The silane starting material may be present separately or in admixture.

The ratio of R groups to silicon atoms in the silane (R/Si ratio) may be in the range between 0.05 to 3 and will preferably be in the range from 0.05 to 1.25.

It is preferred that a monovalent organic group attached to silicon atom in a hydrolyzable silane that is an alkenyl group be an alpha-beta-unsaturated group such as a vinyl group. Beta-gamma-unsaturated groups in alkenyl silanes, particularly methallyl groups in methallylsilanes, tend to be highly unstable during hydrolysis. Thus, these groups, like beta-halo-substituted propyl and butyl groups, may be considered to be hydrolyzable groups in the practice of the invention, since such groups are removed from silane starting materials during hydrolysis.

Examples of hydrolyzable organo-substituted halosilanes that may be used in the practice of the present invention include: alkylsilanes such as methyltrichlorosilane, methyltribromosilane, methyltrifluorosilane, ethyltrifluorosilane, diethyldifluorosilane, ethyltrichlorosilane, diethylethoxychlorosilane, ethyldiethoxychlorosilane, 1-propyltrichlorosilane, 1-propyltrifluorosilane, dipropyldichlorosilane, 1-butyltrichlorosilane, isobutyltrichlorosilane, dibutyldifluorosilane, 1-pentyltrichlorosilane, isoamyltrichlorosilane, 1-pentyltrifluorosilane, di-1-pentyldifluorosilane, 1-hexyltrichlorosilane, 1-heptyltrichlorosilane, 1-octyltrichlorosilane, 1-decyltrichlorosilane, 1-dodecyltrichlorosilane, alpha - chloroethyltrichlorosilane, alpha-chloropropyltrichlorosilane, gamma-chloropropyltrichlorosilane, alpha-chlorobutyltrichlorosilane, isopropyltrichlorosilane, tertiary hexyltrichlorosilanes, secondary butyltrichlorosilane, secondary amyltrichlorosilanes, secondary hexyltrichlorosilanes, secondary octyltrichlorosilanes, and secondary nonyltrichlorosilanes; alkenylsilanes such as vinyltrichlorosilane; arylsilanes such as phenyltrichlorosilane, a-naphthyltrichlorosilane, phenyltrifluorosilane, diphenyldichlorosilane, p-chlorophenyltrichlorosilane, p-tolyltrichlorosilane and phenylmethyldichlorosilane; aralkylsilanes such as beta-tolylbutyltrichlorosilanes, beta-tolylpropyltrichlorosilanes, beta-tolyisobutyltrichlorosilanes, benzyltrichlorosilane, beta - phenylethyltrichlorosilane, beta-tolylethyltrichlorosilanes, beta - phenylpropyltrichlorosilane, gamma - phenylpropyltrichlorosilane, beta - (chlorophenyl)ethyltrichlorosilanes, beta-(trichlorophenyl)ethyltrichlorosilanes, beta - (dichlorophenyl)ethyldichlorosilanes, beta-(dichlorophenyl)propyltrichlorosilanes, alpha-phenylethyltrichlorosilane, alpha - tolylethyltrichlorosilanes and alpha-(chlorophenyl)-ethyltrichlorosilanes; and cycloaliphaticsilanes such as cyclohexyltrichlorosilane, cyclohexylmethyldichlorosilane, trimethylcyclohexyltrichlorosilanes and p-tertiary-amylcyclohexyltrichlorosilane.

Examples of cross-linked organosilanes that may be present in a hydrolyzable silane composition used in the practice of the invention include: bis(trichlorosilyl)-isobutanes, tri(dichlorosilylmethylene), trichlorosilylmethyltrichlorosilane, 1,2-bis(trichlorosilyl)ethane, bis-(trichlorosilyl)benzenes, trichlorosilylethylcyclohexyltrichlorosilane, 1,6-bis(trichlorosilyl)hexane, 1,6-bis-(trichlorosilyl)-2,5-dimethylhexane and 1,3 - bis - (trichlorosilyl)-propane.

The preferred silanes to be used in the practice of the invention include monorgano- and diorgano-substituted silanes in which the organic groups contain from one to six carbon atoms. When the organic groups consist of alkyl groups, it is preferred that they be primary or secondary alkyl groups, and it is desirable that they be primary or secondary alkyl groups having from two to four carbon atoms.

Buffers applicable to use in the present invention include metal compounds, other than hydroxides, which are capable of taking up the halogen liberated from the silane during hydrolysis. Buffer compounds may be defined as compounds which react with an acid to replace the "acid" hydrogen atom with the metal cation of the buffer, thereby forming the metal salt of such acid.

It is to be understood that the buffer employed in the present invention are in fact metal bases, other than hydroxides, with respect to the hydrogen halide that is formed during the hydrolysis. In other words, the buffer is a compound which releases its cation to replace the hydrogen of the hydrogen halide by-product.

Such a compound is the substitution product of a substance with a labile hydrogen atom, having a dissociation constant (for the hydrogen) at least as small as about $1.1 \times 10^{-2}$, in which the labile hydrogen atom has been replaced by a valence of any metal which is capable of forming a chloride, aroxylate, or acylate salt, e.g., an alkali metal (i.e., sodium or potassium), an alkaline earth metal (i.e., calcium, barium or strontium) or lead, zinc or magnesium. In other words, in order that a compound of such a metal may be basic, it must be a compound of such a metal with a substance having a dissociation constant (for the labile hydrogen atom) equal to or less than that of phosphoric acid.

The most common examples of such metal bases include the borates, carbonates, alcoholates (such as the methoxides and ethoxides), bicarbonates, citrates, phosphates and acetates of such metals, particularly of the alkali metals.

The following examples illustrate the practice of the invention:

EXAMPLE 1

An aqueous silanol dispersion is produced by the method of the invention by the following procedure:

(a) A buffer (10.14 grams of sodium bicarbonate) is mixed with water (55 grams) and the solution is placed in a 2,000 ml. three-necked round bottom flask equipped with a stirrer and a dropping funnel. An organosilane (6 grams of methyltrichlorosilane) is placed in the dropping funnel and is added to the flask dropwise with stirring over a period of about two minutes. When the addition is complete, the mixture in the flask is poured into water (1,000 grams).

(b) The procedure described in (a) is repeated, except that the amount of sodium bicarbonate used is 7.56 grams, and the organosilane used is dimethyldichlorosilane (6 grams).

(c) The procedure described in (a) is repeated, except that the amount of sodium bicarbonate used is 4.62 grams, and the organosilane used is trimethylchlorosilane (6 grams).

(d) The procedure described in (a) is repeated, except that the amount of sodium bicarbonate used is 9.07 grams, and the organosilane used is ethyltrichlorosilane (6 grams).

(e) The procedure described in (a) is repeated, except that the amount of sodium bicarbonate used is 6.38 grams, and the organosilane used is dimethylchlorosilane (6 grams).

(f) The procedure described in (a) is repeated, except that the amount of sodium bicarbonate used is 4.12 grams, and the organosilane used is diethylchlorosilane (6 grams).

(g) The procedure described in (a) is repeated, except that the amount of sodium bicarbonate used is 8.32 grams, and the organosilane used is propyltrichlorosilane (6 grams).

(h) The procedure described in (a) is repeated, except that the amount of sodium bicarbonate used is 7.31 grams, and the organosilane used is a sec.-amyltrichlorosilane (6 grams), prepared as follows: A mixture of pentenes (1.19 mols, comprising a high percentage of 2-pentene) and silicochloroform (1 mol) is pumped into an opening at the bottom of a reactor which consists of a vertical tube approximately twenty inches in length, having an internal diameter of about five inches. The length of the reactor is surrounded by electrically heated coils, covered with asbestos packing, which maintain the temperature in the reactor at approximately 370° C. The reactants are permitted to remain in the reactor for approximately one hour, during which time the pressure inside the reactor is about 1,000 pounds per square inch gauge. The reactor is cooled to room temperature, and the products formed are removed and fractionally distilled through a jacketed column four feet in length packed with glass helices. The products recovered include a 48 percent yield (based on pentene) of a sec.-amyltrichlorosilane, B.P. 165–170° C. at atmospheric pressure, as well as unreacted silicochloroform and pentenes.

(i) The procedure described in (a) is repeated, except that the amount of sodium bicarbonate used is 7.05 grams, and the organosilane used is phenyltrichlorosilane (6 grams).

(j) The procedure described in (a) is repeated, except that the amount of sodium bicarbonate used is 6.8 grams, and the organosilane used is cyclohexyltrichlorosilane (6 grams).

(k) The procedure described in (a) is repeated, except that the amount of sodium bicarbonate used is 9.32 grams, and the organosilane used is vinyltrichlorosilane (6 grams).

(l) The procedure described in (a) is repeated, except that the amount of sodium bicarbonate used is 7.81 grams and the organosilane used is 1-butyltrichlorosilane (6 grams).

(m) A silanol dispersion is prepared by the procedure described in (l) except that the buffer used is sodium carbonate (4.98 grams).

(n) A silanol dispersion is prepared by the procedure described in (l) except that the buffer is sodium acetate (7.63 grams).

(o) The procedure described in (a) is repeated, except that the organosilane used consists of a mixture of 1-butyltrichlorosilane (3.99 grams) and silicon tetrachloride (2.01 grams), and the amount of sodium bicarbonate used is 9.32 grams.

(p) The procedure described in (a) is repeated, except that the organosilane used consists of a mixture of 1-butyltrichlorosilane (3 grams), and silicon tetrachloride (3 grams), and the amount of sodium bicarbonate used is 9.49 grams.

(q) The procedure described in (a) is repeated, except that the organosilane used consists of a mixture of 1-butyltrichlorosilane (0.3 gram) and silicon tetrachloride (5.7 grams), and the amount of sodium bicarbonate used is 11.8 grams.

A cross-linked silanol dispersion may be prepared as follows:

(r) A cross-linked silane (a bis(trichlorosilyl)isobutane) is prepared according to the following procedure:

A carbon steel reactor consisting of a vertical tube approximately twenty inches in length, having an internal diameter of five inches, is heated to a temperature of approximately 340° C. by means of electrical heating coils which surround the length of the tube. A mixture of silicochloroform (3340 grams) and commerical diisobutylene (1910 grams of a mixture comprising 80 weight percent of 2,4,4-trimethylpentene-1 and 20 percent of 2,4,4-trimethylpentene-2) is pumped into the heated reactor through an opening in the bottom. When the addition, which requires a period of about one hour, is complete, the opening is sealed and the mixture is allowed to remain in the reactor for four hours longer. During this period the mixture is heated by means of the heating coils at temperatures ranging between 320 and 340 degrees C., while the pressure inside the reactor ranges from 1000 to 1200 pounds per square inch gauge. The heating is then discontinued, and the product is removed.

The product recovered (4350 grams) is fractionally distilled through an electrically heated, jacketed glass column four feet in length, packed with a single-turn glass helices and having a variable reflux head. The forerun (i.e., material boiling in a range up to about 135 degrees C. at 740 mm. Hg) comprises low boiling hydrocarbon gases (which are primarily saturated hydrocarbons having three or four carbon atoms), silicochloroform (200 grams) and a mixture of the diisobutylene starting materials (10 grams). The following materials are recovered after collecting the forerun: methallyltrichorosilane (740 grams); a fraction (370 grams) boiling within a range of 148 to 200 degrees C. at 740 mm. Hg, which comprises a mixture of pentyl-, hexyl- and heptyltrichorosilanes; a fraction (1075 grams) which is a mixture of octyltrichlorosilanes, comprising 2,4,4-trimethyl-1-pentyltrichlorosilane and 2,4,4-trimethyl-3-pentyltrichlorosilane, and a bis(trichlorosilyl)isobutane, which is believed to be 1,3-bis-(trichlorosilyl)isobutane (1260 grams, B.P. 225 to 236 degrees C., density at 28 degrees C. compared with that of water at 4 degrees C. ($d_4^{28}$) 1.377, index of refraction at 27 degrees C. ($n_D^{27}$) 1.472). A residue (60 grams) remains after the distillation.

A bis(trichlorosilyl)isobutane prepared as described above (6 grams) is added to a solution of sodium bicarbonate (9.32 grams) in water (500 grams) by the procedure described in (a) above. When the addition is complete, the mixture in the flask is poured into water (1,000 grams).

(s) The procedure described in the preceding paragraph is repeated, except that a mixture of ethyltrichlorosilane (5.4 grams) and the bis(trichlorosilyl)isobutane (0.6 gram) is used, and the amount of sodium bicarbonate used is 9.25 grams.

(t) The procedure described in the last paragraph of (r) above is repeated, except that the bis(trichlorosilyl)-isobutane is first chlorinated to form a bis(trichlorosilyl)-2-chloroisobutane (believed to be 1,3-bis(trichlorosilyl)-2-chloroisobutane). The amount of sodium bicarbonate used is 8.57 grams.

EXAMPLE 2

An aqueous silanol dispersion of the invention is produced by the following procedure:

(a) The procedure described in Example 1(a) is repeated, except that the amount of sodium bicarbonate used is 6.80 grams, and the organosilane used is 1-hexyltrichlorosilane (6 grams).

(b) The procedure described in Example 1(a) is repeated, except that the amount of sodium bicarbonate used is 6.05 grams, and the organosilane used is 1-octyltrichlorosilane (6 grams).

(c) The procedure described in Example 1(a) is repeated, except that the amount of sodium bicarbonate used is 5.54 grams, and the organosilane used is a mixture of nonyltrichorosilanes (6 grams, comprising mainly secondary nonyltrichorosilanes).

(d) The procedure described in Example 1(a) is repeated, except that the amount of sodium bicarbonate used is 4.79 grams, and the organosilane used is 1-dodecyltrichlorosilane (6 grams).

(e) The procedure described in Example 1(a) is repeated, except that the amount of sodium bicarbonate used is 6.8 grams, and the organosilane used is a tert.-hexyltrichlorosilane (6 grams).

EXAMPLE 3

A buffer (9 grams of sodium bicarbonate) is mixed with a mixture of water and ice (1500 cc.). To the resulting solution, at a temperature of 10 degrees C. in a 3-liter three-necked flask fitted with a stirrer and a dropping funnel, is added dropwise with stirring over a period of above two minutes an organosilane (4 grams of isobutyltrichlorosilane). The pH of the resulting silanol dispersion is 6.8. Raw glass fibers (200 grams) are added to the dispersion. The glass fibers are immediately filtered from the dispersion and washed twice with the filtrate, and the glass fibers are then weighed to determine the aqueous silanol dispersion pick-up, which is 350 grams. The treated fibers are dried at 65 degrees C. The fibers show strong water repellency, i.e., drops of water on the fibers can be shaken off with substantially no wetting of the surface of the fibers.

EXAMPLE 4

A buffer (30 grams of sodium bicarbonate) is mixed with water (2000 grams) at a temperature of 20 degrees C. To the resulting solution in the apparatus described in Example 3 is added dropwise with stirring over a period of eight minutes an organosilane (22 grams of isobutyltrichorosilane). The pH of the resuting silanol dispersion is 6.2. Glass botles are then dipped in the silanol dispersion. The treated glass bottles, after being dried at 65 degrees C., show strong water repellency.

EXAMPLE 5

A buffer (66 grams of sodium bicarbonate) is mixed with water (1200 grams To the desulting solution in the apparatus described in Example 3 is added dropwise with stirring over a period of thirty minutes an organosilane (50 grams of 1-butyltrichlorosilane). The temperature of the mixture in the flask is maintained below 10 degrees C. during the addition. The pH of the resulting butylsilanol dispersion is 5.6. Samples of cotton poplin cloth (7 in. by 7 in.) are immersed in the silanol dispersion for one minute. The treated samples are passed through a pair of rolls to remove the excess solution, and the samples are then dried for five minutes at a temperature of 300 degrees F. A spray rating of 50 to 55 (determined in accordance with Section IV (part 5) of the Supplement to Federal Specification CCC–T–191a, October 8, 1945), is obtained on the treated textile samples. Upon washing the treated samples with water at room temperature (to remove sodium chloride), the hand of the cloth is soft and full. Furthermore, upon repeated laundering in hot dilute soap solution and upon repeated dry cleaning, the cloth retains its water repellency well.

EXAMPLE 6

Using the procedure and apparatus described in Example 5 a hydrolyzable silane composition (a mixture of 30.64 grams of 1-butyltrichlorosilane and 6.8 grams of silicon tetrachloride) is added dropwise with stirring over a period of thirty minutes to a solution of a buffer (53.72 grams of sodium bicarbonate) in water (1000 grams). The pH of the resulting butylsilanol dispersion is 6.0. Samples of cotton poplin cloth (7 in. by 7 in.) are immersed in the silanol dispersion for three minutes. The excess solution is then removed by passing the cloth between rolls. The samples are dried for fourteen minutes at a temperature of 300 degrees F. A spray rating of 95 is obtained on the treated textile samples. Upon washing the treated samples with water at room temperature (to remove sodium chloride), the hand of the cloth is soft and full, and the spray rating is not appreciably lowered.

EXAMPLE 7

Small rectangular samples of balsa wood are immersed for a few minutes in the butylsilanol dispersion prepared as described in Example 6. The treated pieces of wood are then cured for 45 minutes in an oven at a temperature of 208 degrees F. Several pieces of the treated wood, along with several pieces of untreated wood, are weighed and are then weighted down and held immersed under water for fifteen and one-half hours. At the end of this time, the pieces of wood are again weighed. From the increase in weight of each sample of wood the percent of its weight in water absorbed is calculated. The treated pieces of wood absorb 80.5 percent of water, while the untreated pieces absorb 99.5 percent of water. (The treated wood absorbs considerably less water when the silanol dispersion is more carefully applied so that all the pores of the wood are coated.) Several other samples of the treated wood along with samples of the untreated wood are floated on water. After 24 hours each sample of the treated wood is completely visible, while the samples of untreated wood are three-quarters submerged, i.e., only one-fourth of the upper surface is not covered with water. After 72 hours the treated pieces are only one-half submerged, whereas the untreated pieces are completely submerged.

In the preceding examples, similar good results are obtained when the silanols employed are replaced with any of the dilute silanol dispersions prepared as hereinbefore described. Furthermore, any of the other materials hereinbefore described may be rendered strongly water repellent by treatment with such silanol dispersions. For example, common red bricks painted with a silanol dispersion produced in accordance with the present method and then air-dried show excellent water repellency.

Uses

The stable aqeous silanol dispersions produced by the method of the invention are extremely useful in imparting water repellency to various materials. In fact, one of the most important embodiments of the present invention is a method of improving the water repellency of a surface that is reactive with a silanol which comprises applying a stable aqueous silanol dispersion produced by the method of the invention, at a pH between 3 and 8, to such a surface.

Such materials will have surfaces which are reactive with the silanol and the principal example of such a surface is having hydroxyl groups therein whereby a bond between the silanol and the surface is effected. Of such hydroxylated materials that may be treated in accordance with the present method the most important are siliceous materials and carbohydrates, including silicates (particularly magnesium silicate), cellulose, porous ceramic materials, glass, clay, non-carbonaceous masonry, sand and ores (for flotation). Other materials which may be effectively rendered water repellent by the present method include wood products, paper and mineral fillers (in addition to glass fillers and silicates) such as clay, mica and talc. The mineral fillers, i.e., fillers for use in, for example, molding compositions, which may be rendered water repellent by silanol dispersions of the invention include asbestos.

A particularly important application of the present method is the treatment of glass surfaces including glass fibers, glass cloth, glass bottles, glass plates and the like. The treatment of glass fibers and glass cloth to be subsequently employed in the production of synthetic resin laminates provides improved laminates. Improvement resides in the production of high wet strength and a better bond between the glass and resin.

The treatment of any of the above-described materials with an aqueous silanol dispersion made in accordance with the present method consists simply in immersing the material to be treated in the aqueous silanol dispersion or applying the dispersion to the material with an ordinary paint brush until the proportion of silanol adhering to the material is within the desired range, as hereinbefore discussed, and then drying the material, e.g., by moderate heating or by air-drying. When a silanol dispersion produced by the method of the invention is dried after being applied to a material to be treated, condensation of the silanol takes place to form an insoluble, water repellent silicone.

I claim:

1. The method of treating a surface which is reactive with a silanol to produce a coating of insoluble organosilicon compounds thereon, which comprises treating said surface with an aqueous dispersion of a silanol, said dispersion having been prepared by hydrolyzing a silane, having a structure corresponding to the formula

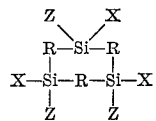

wherein R is an organic group containing from 1 to 12 carbon atoms inclusive, X is a member chosen from the group consisting of chlorine, bromine and fluorine and Z is a member chosen from the group consisting of R and X, in an aqueous solution of a metallic salt of an acid having a dissociation constant not greater than phosphoric acid, the metallic radical of said salt being chosen from the group consisting of an alkali metal, an alkaline earth metal, zinc and magnesium, and drying said surface at an elevated temperature to cure said silanol.

2. A method as defined in claim 1, wherein the silane is a chlorosilane.

3. A method as defined in claim 1, wherein the buffer is a carbonic acid salt of an alkali metal.

4. A method as defined in claim 1, wherein the amount of buffer is sufficient to retain the pH of the resulting dispersion between 4 and 7.

References Cited in the file of this patent

UNITED STATES PATENTS

| | | |
|---|---|---|
| 2,390,370 | Hyde | Dec. 4, 1945 |
| 2,426,912 | Wright | Sept. 2, 1947 |
| 2,439,689 | Hyde | Apr. 13, 1948 |
| 2,501,525 | Krieble et al. | Mar. 21, 1950 |
| 2,561,429 | Sveda | July 24, 1951 |
| 2,590,812 | Barry | Mar. 25, 1952 |
| 2,600,307 | Lucas et al. | June 10, 1952 |
| 2,624,721 | Hatcher et al. | Jan. 6, 1953 |
| 2,640,063 | Kohl | May 26, 1953 |

UNITED STATES PATENT OFFICE
CERTIFICATE OF CORRECTION

Patent No. 3,154,431                                                October 27, 1964

Thomas R. Santelli

It is hereby certified that error appears in the above numbered patent requiring correction and that the said Letters Patent should read as corrected below.

Column 4, line 71, for "(55 grams)" read -- (500 grams) --.

Signed and sealed this 10th day of August 1965.

(SEAL)
Attest:

ERNEST W. SWIDER                                      EDWARD J. BRENNER
Attesting Officer                                            Commissioner of Patents